(12) United States Patent
Podlas

(10) Patent No.: US 7,108,744 B2
(45) Date of Patent: Sep. 19, 2006

(54) TAPE JOINT COMPOUNDS WITH CMC THICKENER SYSTEM

(75) Inventor: Thomas J. Podlas, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 10/939,815

(22) Filed: Sep. 13, 2004

(65) Prior Publication Data

US 2005/0056187 A1    Mar. 17, 2005

Related U.S. Application Data

(60) Provisional application No. 60/503,268, filed on Sep. 15, 2003.

(51) Int. Cl.
   *C09K 3/10*    (2006.01)
   *C09K 101/28*  (2006.01)
   *C08L 1/28*    (2006.01)

(52) U.S. Cl. .................. 106/172.1; 106/780; 106/801; 106/805; 106/140.1; 106/162.81; 106/162.82; 106/173.01; 106/190.1; 524/45

(58) Field of Classification Search ................ 106/780, 106/801, 805, 140.1, 162.81, 162.82, 172.1, 106/173.01, 190.1; 524/45
See application file for complete search history.

(56) References Cited

U.S. PATENT DOCUMENTS

| 3,891,582 A | | 6/1975 | Desmarais ................ 260/17 R |
| RE29,753 E | * | 9/1978 | Williams ..................... 106/85 |
| 5,336,318 A | | 8/1994 | Attard et al. ............... 106/780 |
| 5,382,287 A | | 1/1995 | Podlas ...................... 106/197.2 |
| 5,512,616 A | | 4/1996 | Podlas .......................... 524/18 |
| 6,712,897 B1 | * | 3/2004 | Ayambem et al. ....... 106/189.1 |
| 2004/0158058 A1 | * | 8/2004 | Cash et al. ................... 536/98 |

* cited by examiner

*Primary Examiner*—David Brunsman
(74) *Attorney, Agent, or Firm*—David Edwards

(57) ABSTRACT

CMC with CMDS greater than or equal to 0.76, optionally with a non-ionic co-thickener or a CMC with CMDS less than 0.75 is used as both the rheology modifier and partial clay substitute in tape joint compounds. This significant reduction of clay level is sufficient to eliminate most of the negative characteristics of clay in joint compound.

38 Claims, No Drawings

TAPE JOINT COMPOUNDS WITH CMC THICKENER SYSTEM

This application claims benefit of U.S. Provisional application 60/503,268, filed on Sep. 15, 2003

FIELD OF INVENTION

This invention relates to compositions useful as joint sealing materials in the building material industry. In particular, this invention relates to the use of carboxymethylcellulose (CMC) with a high degree of carboxymethyl substitution (CMDS) and the use of a reduced amount of clay for improving tape joint compositions.

BACKGROUND OF THE INVENTION

Wallboard is generally installed in large panels, which are nailed, screwed, or glued to the studding of walls of buildings. The joints where sections of the wallboard are butted together are covered with a joint compound and then a fiberglass or paper reinforcing tape is embedded within the joint compound and then permitted to dry. When the joint compound is dry, a second application of the joint compound is applied over the joint and is permitted to dry. A coating of the joint compound is also applied to cover nail heads or screws or any cracks in the wallboard and let dry. After the joint compound dries, the joint and covering of the nails or screws are lightly sanded and the wall is then finished with decorating material such as paint.

Typically, tape joint compositions, which are normally referred to as joint compounds, contain a binder, a thickener system, a filler, water, a biocide, clay and mica. This joint composition is a ready-mix, drying type composition that is normally sold in five-gallon cans or corrugated boxes. The water and filler are the ingredients that comprise the largest weight percentage in the joint composition. Joint compounds are either regular weight compounds that are the traditional type or lightweight compounds. The regular weight joint compounds have a weight of about 13 to 14 pounds per gallon (ppg) (1.55–1.65 g/cc) while the lightweight joint compounds have a weight of about 8 to 10 ppg (0.9–1.2 g/cc.) The lightweight joint compound is becoming the more desirable compound used in the industry.

Although attapulgite clay is the clay of choice for tape joint compound rheology control, it imparts to the tape joint composition many undesirable properties. Attapulgite clay (1) is a key factor causing rheology and viscosity instability with aging of the joint compound, (2) can contribute to cracking upon drying, (3) can give a mealy, grainy texture to the tape joint composition requiring repeated troweling to obtain a smooth surface on the wall, (4) is a natural product requiring either lot-to-lot standardization by the user or constant changes in water demand and clay use level due to its natural variability, (5) causes variability in extent of shrinkage upon drying, especially when use levels have to be altered due to lot-to-lot variability, and (6) may cause unwanted color variation in joint compound. Notwithstanding, attapulgite clay is typically used in the 1.5–3.5% by weight range.

There are benefits to the use of CMC in joint compounds. It does not entrap/entrain air, therefore pinholing post-sanding will not be a problem. Normally, CMC does not give sufficient slickness to a joint compound. However, when the attapulgite clay level is reduced, it does.

Although CMC has been used in tape joint compositions as a clay and/or mica replacement, it is difficult to accommodate in joint compound primarily because of the presence of low molecular weight cations, such as $Mg^{++}$, $Al^{+++}$ or $Ca^{++}$ that are present. Even at relatively low concentrations, these cationic species can complex the CMC, resulting in gelation with undesirable joint compound rheology. Investigators have found ways to make specific CMC products perform acceptably under certain conditions.

U.S. Pat. No. 3,891,582 discloses a joint composition for wallboard sealing containing a resinous binder, limestone, clay, mica, lubricant, stabilizer and a thickener which are mixed with water to form a dope which is normally applied by troweling. A water-insoluble, fibrous CMC is used as an asbestos substitute.

U.S. Pat. No. 5,336,318 discloses clay-free joint compounds made with typical, industry-accepted thickeners in combination with an associative thickener. This composition cannot be used when dolomite limestone is used.

U.S. Pat. No. 5,382,287 discloses the use of superabsorbent CMC with a carboxymethyl degree of substitution (CMDS) in the 0.35–0.75 range and a degree of polymerization (DP) between 200 and 4000 to serve as a swelling agent and can replace clay and/or mica in a joint compound formulation when used in an amount of 0.01 to 0.5% by weight.

U.S. Pat. No. 5,512,616 discloses a joint compound composition using unborated HPGuar. It is specifically stated that underivitized guar cannot be used. No mention is made of reduced clay levels. The present invention makes use of underivitized guar when the attapulgite clay is reduced to levels well below standard practice, e.g., to 0.25–0.75% (1.5–2.5% is "typical").

None of the prior art discloses the instant invention. Yet in spite of what was known in the prior art, a need still existed for simpler means for producing tape joint compounds.

SUMMARY OF THE INVENTION

The present invention is related to a ready-mix, drying type tape joint compound composition comprising a binder, a thickener system, a filler, water, and a biocide, wherein the thickener system comprises an uncrosslinked sodium carboxymethylcellulose (CMC) with a degree of substitution (DS) lower limit of 0.76 and a degree of polymerization (DP) lower limit of 1,000 and is present in an amount of 0.01 to 0.6% by weight based on the total weight of the composition. In the present composition, clay and mica can be present in minor amounts, if at all. In other words, the clay and mica are optional and can be present in amount from zero percent up to 0.75 weight percent.

DETAILED DESCRIPTION OF THE INVENTION

It was surprisingly found that attapulgite clay could be used in ready mixed, drying type tape joint compositions with CMC having a CMDS of at least 0.76, if the clay was kept to an amount at or below 0.5% by weight in regular weight joint compound, and 0.75% by weight in lightweight joint compound. Prior to the present invention, the clay adversely affected the viscosity stability of the compound, particularly at high temperatures, i.e., higher than about 100° F., the exact temperature being function of type of joint compound and raw material types and ratios. Furthermore, the attapulgite clay also adversely affects the crack resistance of drying type joint compounds. Hence, it had been an objective to significantly reduce or eliminate attapulgite clay from these types of joint compounds in order to eliminate these drawbacks of the clay.

In accordance with the present invention, the drying type joint compound compositions of this invention contain a binder, a thickener system, a filler, water, a biocide, clay (subject to the limitations given above) and, optionally, mica. Additional ingredients that are commonly used in joint compounds are preservatives, wetting agents, defoamers, and plasticizers. These additional ingredients are normally used in minor amounts generally ranging from about 0.05 to about 1.0% based on the total dry weight of the composition.

Binder:

The commonly used binder in ready mixed, drying type joint compound compositions are latex emulsions such as polyvinyl alcohol, ethylene vinyl acetate latex, or poly (vinyl acetate) latex, which are acidic. The resinous binder is a coalescent agent that upon drying of the cement forms a thin matrix to hold the clay, mica, limestone, and in the present case, the CMC. In other words, the binder is the matrix that holds the other ingredients in their proper places so as to form the desired product. Hence, the binder is an essential ingredient in the joint compound. Other materials that can be used as binders include starch, casein, polyacrylamide, and copolymers of acrylamide and acrylic acid. In general, the latex binder ranges from a lower limit of about 1% to an upper limit of about 3%, preferably about 2.5 weight %, based on the total weight of the composition.

Thickener System:

The thickener system of the present invention can be solely sodium carboxymethylcellulose (CMC) that has certain characteristics or the thickener system can contain a blend of other rheology modifiers with the CMC. The CMC disclosed herein in combinations with either non-ionic co-thickener/rheology modifiers such as MHPC or guar or others, or in combination with other CMC products not covered by this invention may be used in tape joint compounds as both rheology modifier and partial or complete attapulgite clay substitute. This reduction/elimination of clay does away with the negative characteristics associated with clay usage, while maintaining the positive rheological properties normally imparted by the clay and its interactions with other minerals and water-soluble polymers. The level of mica, one of whose functions is to negate negative aspects of clay (e.g., cracking), may be reduced significantly. (It is common not to use mica in lightweight joint compounds, but is a common ingredient in regular weight products.)

The CMC of the present invention must have a CMDS lower limit of 0.76, preferably 0.78, and an upper limit of 1.5, preferably 1.2. This CMC should also have a degree of polymerization (DP) lower limit of 5000 preferably 6000 with an upper limit of 25,000, preferably 20,000.

Other rheology modifiers that can be used in combination with the CMC of the present invention are, for example, ethylhdyroxyethyl cellulose (EHEC), hydroxyethyl cellulose (HEC), hydrophobically modified hydroxyethylcellulose, hydroxypropyl methylcellulose (HPMC), methylhydroxyethyl cellulose (MHEC), hydroxypropyl guar, and underivatized guar.

The amount of the thickener system in the joint compound composition can range from a lower limit of about 0.01 weight %, preferably 0.3 weight % based on the total dry weight of the joint compound ingredients (excluding the water present in the joint compound composition). The upper limit of the thickener system about 0.6 weight %.

Fillers:

Fillers are an important ingredient in joint compounds. They serve the purpose of adding body to the joint compound, making the compound economical, and controlling the pH of the composition. Conventional fillers that can be used either alone or in combination in the present invention include calcium carbonate, calcium sulfate dihydrate (gypsum), and dolomitic limestone. Calcium sulfate hemihydrate (plaster of Paris) may be used as a minor component in the presence of other fillers in order to better control open time and cracking and other joint compound properties.

The preferred filler is finely ground calcium carbonate. The filler is a dry powder, which usually comprises at least about 45 weight %, preferably 50 weight %, based on the weight of the joint compound composition, and generally falls within the range of about 45 to an upper limit of about 65% by weight. In order to achieve the desired pH of the composition of 8 to 10, the filler is the principal alkaline ingredient and therefore, is the main ingredient that controls the pH. If for some reason, the filler cannot provide the adequate adjustment of the pH, if necessary, a pH modifier may be also added to increase the alkalinity of the composition.

Water:

Water is added to the dry ingredients of the joint compound to provide the viscosity of the joint compound composition generally in the range of from about 300 to about 700 Brabender units. When the dry ingredients are mixed on site, the amount of water added to form a ready mixed joint compound or a wetted joint compound will depend on the desired viscosity.

A Biocide:

A biocide is an important ingredient in joint compound compositions. They increase the shelf life and prevent the composition from spoiling. In other words, biocides prevent microorganisms, such as mold, bacteria and fungi, from growing in the composition and also on the walls of the building structure in which it is used. Examples of two efficient industry-accepted biocides are:

Troysan® 174 product, , (2[(Hydroxymethyl)amino]ethanol), a broad spectrum biocide, marketed by Troy Chemical Corp.,; and, Proxel® GXL product, (1,2-benzisothiazolin-3-one), an all purpose biocide; marketed by ICI Americas.

The biocide should generally be present in the amount ranging from a lower limit of about 0.05 to an upper limit of about 1.0% by weight based on the total weight of the ingredients.

Clay and/or MICA:

In accordance with the present invention, suitable clays for use in a joint compound are any of the natural earthy, fine-grained, largely crystalline substances of hydrous aluminum silicates usually containing alkalies, alkaline earth, and iron that make up the group of clay materials. Included in this group are sepiolite, montmorillonite, bentonite, illite, kaolin, and attapulgite. Attapulgite is the preferred clay. Attapulgite is typically used at levels ranging from 1.5 to 3.5% of the total weight of the joint compound.

In accordance with the present invention, It has been found that positive affects of the clay out strip the negative effects when used in the small amounts equal to or less than about 1.0 weight %, preferably less than about 0.75 weight %, and more preferably less than 0.5 weight % based on the total weight of the composition. It should also be noted that the lower limit of the clay in this invention is zero. These ranges cover all weights, such as lightweight and heavy weight compounds, and would be varied based on the desired characteristics of the compound. The benefits of clay as typically used are described in the Background section above. Depending on formulation variables, the total elimination of the clay may (but not always, as will be seen with the cited examples herein) result in a joint compound with weak body, one that is difficult to trowel and obtain a uniform thickness of joint compound under the trowel. If the low levels of clay cited directly above are used in conjunction with the CMC, this potential drawback is eliminated, and, the additional positive effects of less cracking, smoother texture, and less shrinkage obtained when clay is present at low use levels are retained.

Miscellaneous Ingredients:

If a lightweight drying type joint compound having improved crack resistance is desired, the lightweight property can be provided by incorporating specially treated expanded perlite into the formulation. It is well known in the art that the expanded perlite should have a particle size, which will pass through a 100-mesh screen, if it is to be incorporated into a joint compound. The expanded perlite is a very lightweight material which contains many fine cracks and fissures which may be penetrated by water and could thereby destroy its ability to render the joint compound lightweight. As a result, the expanded perlite is often treated to render it water-insensitive. The preferred method is to treat the expanded perlite with a silicone compound but other materials may be used to render it water-insensitive. The specially treated expanded perlite is commercially available from suppliers such as Silbrico Corporation. If non-treated perlite is used, care is taken to prevent undue water absorption during manufacture and over the expected shelf life of the joint compound. The lightweight examples illustrated herein were prepared using Silbrico's SilCell® 3534 product, a surface treated perlite that is commonly used in the industry. The perlite can be used in amounts having an upper limit of about 8.5 weight percent, preferably 6.0 weight percent.

Depending on local preferences, other ingredients may be used in the joint compound formulation. These include but are not limited to air entraining agents, surfactants, humectants, pH buffering salts, defoamers, and mixtures thereof.

The present invention has many advantages over the prior art. It does not rely on a superabsorbent CMC with limited solubility and extreme thixotropic behavior in aqueous media. Hence, the present invention has an advantage over U.S. Pat. No. 5,382,287 patent in that the CMC product is easier to use, does not require specific joint compound manufacturing steps that may not be available to all manufacturers and potential users of the current technology. Also, the current technology allows the use of lower levels of thickeners than what is needed when U.S. Pat. No. 5,382,287 technology is practiced. Evidence also suggests that higher CMDS, greater than 0.75, is perhaps more efficient, also differentiating the current technology from the U.S. Pat. No. 5,382,287 patent. This is surprising because the greater the CMDS, the greater the expectation of the chance of reaction between the ionized carboxyls of the CMC with the cationic species typically found in joint compounds.

Normally, joint compounds can be prepared by combining all of the wet ingredients and mixing for one minute to homogenize. A blend of all the solids is then added to the mixing bowl, with continuing mixing. The entire mass is blended for a total of up to 20 minutes. Different manufacturers may modify this procedure. In general, the higher the concentration of clay, the greater the required mixing time. Hence, the use of the reduced levels of clay described herein may in many cases permit the reduction of said mix time, with increase in total plant output.

CMC with a CMDS>0.75 and within the Mw and DP limits given above, may be used in the practice of this invention. Aqualon products CMC 7H4XF, X33277-58-3, and X33432-76-2, all of whose properties are described herein, Noviant's Cekol® 100,000 product and Wolffs Walocel® 40,000 product also described herein, may all be used as thickeners in tape joint compound, either by themselves or with a co-thickener, this second thickener being select CMC that does not fulfill the requirements of the current invention and that cannot be used as the sole thickener in joint compound, or, hydroxyethylcellulose, hydrophobically modified hydroxyethylcellulose, hydroxypropyl guar, methylhydroxypropylcellulose, underivitized guar, other thickeners well-known to those skilled in the art, or combinations thereof. The choice of co-thickener, and the ratio of the two (or more) thickeners will determine if attapulgite clay must still be used to impart desirable joint compound rheology. For example, using 7 parts un-derivatized guar with 3 parts Cekol® 100,000 product enables the total elimination of the attapulgite clay when the thickener is used at a 0.6% level. If the thickener blend is the guar with Aqualon product X33432-76-2, also at a total use level of 0.6% and at a 7/3 ratio by weight, the attapulgite level again may be eliminated. This shows that diverse products, one with a CMDS of 0.76 and a DP of 9800, the other having a CMDS of 0.92 and a DP of 20,000 may be used. However, if an Aqualon product with the same DP but lower CMDS (0.62) is the CMC component with the guar at the same ratio, the joint compound is noticeably weaker, also having gel character that would make troweling very difficult, as the joint compound rolls up on itself. Hence, the lower CMDS of 0.62 has been found to be unacceptable. A three-component blend at a use level of 0.6%, consisting of 3.5 parts CMC 7H4XF+1.5 parts Cekol 100,000 product+5.0 parts guar enables the attapulgite to be reduced to less than 0.25%, the exact optimum level not being yet determined (it is finite, >0% level). Typical thickener use levels in regular weight products are 0.4–0.5% on total weight of joint compound. Work is in progress to determine minimum usage levels for the thickeners that are the subject of this invention. Prior work, using either crosslinked, partially insoluble, or thixotropic CMC and other standard thickeners (but no soluble CMC and no co-thickener such as guar) indicated that levels as low as 0.45–0.5% will be feasible. Because of the nature of the guar product, it is expected that total thickener levels at least as low as 0.45–0.5% will be feasible in regular weight joint compound, perhaps as low as 0.4% in lightweights.

EXAMPLES

The following examples illustrate the practice of the invention, which has industrial applicability in the construction industry. Parts and percentages are by weight unless otherwise indicated. Viscosity was measured in Brabender units (B.U.) determined by ASTM C-474-67. Adhesion was also measured by ASTM C-474-67. Cracking and cratering were measured on horizontal panels with air forced across the panels from a 14 inch oscillating fan for 45 minutes and then allowed to dry overnight using the numerical ratings of: none (10), trace (9), very slight (8), slight (7), moderate (6), moderate-heavy (5) or heavy (4). Joint compound preparation techniques, CMDS and DP analyses techniques are also given immediately below.

Standard Joint Compound Preparation Technique

The ingredients shown in Table 1 below were used to prepare the joint compounds whose properties are described herein. The ingredients were intimately mixed using either standard Hobart or Kitchen Aid planetary blenders. The joint compounds were prepared in 1000 gram quantities, including the water. All of the liquid ingredients were added to the mixing bowls, stirred for 20–30 seconds. A pre-blend of all dry ingredients was made by weighing the required amounts of each component into a jar of sufficient volume so that the ingredients may be briefly shaken to effect blending. These dry ingredients were then added to the mixing bowl while in the "on" position at the lowest speed. The addition of all solids was done over a 15 second period of time. The mixture was blended for two minutes, during which time a cohesive paste formed. The mixing was stopped so that material on the sides of the mixing bowl and within the mixing blades was scraped off and returned to the main body of the paste. Mixing was then resumed for 8 minutes, after which the scraping was again carried out. A final 5 minutes of mixing was needed to assure complete wetting and uniform distribution of all ingredients. The joint compound was then covered and allowed to slake for from 16 to 24 hours. At that time, after slight mixing by hand, the viscosity was measured, as shown in Tables 2 and 3. If necessary the joint compound viscosity was reduced to 400 to 425 BU by further addition of small amounts of water, generally less than 3% by weight of total joint compound. The testing of the joint compounds was then performed.

Measurement of the CMDS and CMC Products

The CMC product was dissolved in water and hydrolyzed with 2 molar triifluoroacetic acid (TFA). The CMC/TFA solution was then purged with argon, and in a capped tube was then placed in a heating block at 120° C. for 8 hours. The hydrolyzed CMC was then dried with a stream of nitrogen. This material was referred to as the CMC monosaccharide mixture. It was analyzed for the carboxymethyl substitution by standard liquid chromatography techniques to obtain the CMDS.

Measurement of the Degree of Polymerization of CMC Products

The relative molecular weight of the CMC was first determined by size exclusion chromatography separation of the polymer in an aqueous mobile phase consisting of dilute lithium acetate at pH of 8.5. The Mw calibration is performed with narrow distribution poly(ethylene oxide) and poly(ethylene glycol) (PEO/PEG) standards. The analysis was quantitative, the Mw values were not absolute but were relative to the PEO/PEG calibration. Thus, the required weight average molecular weight (Mw) was expressed as Daltons PEO. This method was applicable to CMC.

Analyses Protocol

The CMC solutions were prepared in 4 oz jars by dissolving 6 mg of solid CMC in 320 ml deionized water and stirring overnight. 30 mls of double strength mobile phase were added to the solution which was then stirred for an additional hour. The solutions were filtered and analyzed via size exclusion chromatography (SEC). A Hewlett-Packard 1047A differential refractometer was the primary detector. This specific SEC methodology to measure molecular weights gave weight average molecular weight (Mw). The degree of polymerization was obtained from this Mw divided by the molecular weight of the glucose unit of the same substitution. Hence, the DP was a weight average degree of polymerization ($DP_w$,) that is referred to herein as. DP for simplicity.

Examples of Joint Compound Performance

The specific joint compound formulas used to illustrate the scope of this invention are shown in Table 1. The traditional "regular weight" ("heavyweight") joint compounds have densities in the 12–15 pounds per gallon (ppg) range, While the lightweight joint compounds have densities in the 7–11 ppg range. The 21 Examples were designed to illustrate the utility of CMC as an active agent in joint compounds, and, define the limits of such usefulness of CMC. Unless stated otherwise as a footnote to the Tables herein, it can be assumed that all of the joint compounds showed good initial properties, being easily troweled and smoothed out on wallboard. Some changed with short-term aging, as so indicated when apropos.

TABLE 1

JOINT COMPOUND FORMULA DETAILS

| Ingredient | Use Level(s) discussed herein Regular weight | "Typical" Use Levels Regular weight | Use Level(s) discussed herein Light weight | "Typical" Use Levels Light weight |
|---|---|---|---|---|
| Water | 30–31% | 30–31% | 39–41% | 38–42% |
| Ground CaCO3 | 62–64% | 62–64% | 49–51% | 49–51% |
| Attapulgite clay | 0–0.5% | 1.7–2.5% | 0–0.75% | 1.5–3.2% |
| Mica | 1.5% | 5–8% | — | — |
| Biocide | 0.1% | 0.1% | 0.1% | 0.1% |
| Latex, PVA | 2.5% | 2.5% | 2.5% | 2–3% |
| Thickener | 0.4–0.6% | 0.4–0.5% | 0.5–0.6% | 0.5–0.6% |
| Perlite | | | 6% | 5–8% |

EXAMPLES 1 TO 9

Regular Weight Joint Compounds

Table 2 below shows the specific components of the Examples and results of the testing of viscosity (BU), cracking, cratering, texture, and adhesion.

TABLE 2

REGULAR WEIGHT ALL PURPOSE JOINT COMPOUND SPECIFIC DETAILS

| Ex. # | % clay | % mica | % Guar | % MHPC | % CMC | CMC TYPE | BU | Cracking | Cratering | Texture | Adhesion |
|---|---|---|---|---|---|---|---|---|---|---|---|
| 1 | 2.0 | 5.0 | 0 | 0.4 | 0 | — | 600 | 6 | 7 | Sm | 99% |
| 2 | 2.0 | 5.0 | 0.43 | | 0.17 | 7H4XF | 760 | 6 | 6 | Gr | 70% |
| 2A | 2.0 | 5.0 | 0.35 | | 0.15 | 7H4XF | 600 | 7 | 7 | Gr | 65% |
| 2B | 2.0 | 5.0 | 0.29 | | 0.11 | 7H4XF | 490 | 7 | 7 | sl. gr | 65% |
| 3 | 0.25 | 1.5 | 0.43 | | 0.17 | 7H4XF | 550 | 9 | 9 | Sm | 99% |
| 4 | .25 | 1.5 | 0.3 | | 0.3 | X33432-76-2 | 475 | 8 | 9 | Sm | 95% |
| 5 | .25 | 1.5 | 0.3 | | 0.3 | X33277-58-3 | 550 | 8 | 8 | Sm | 97% |
| 6 | .25 | 1.5 | 0.25 | | 0.25 | X33277-58-3 | 490 | 9 | 8 | Sm | 90% |
| 7 | 0 | 1.5 | .43 | | .17 | Cekol 100,000 | 580 | 9 | 9 | Sm | 95% |
| 7A | 0 | 0 | .43 | | .17 | Cekol 100,000 | 580 | 8 | 9 | Sm | 95% |
| 8 | 0 | 1.5 | | | .6 | X33277-58-3 & 7H4XF | 530 | 8 | 9+ | Sm | 85% |
| 8A | 2.0 | 1.5 | | | .6 | Same as ex. 8 | 560 | — | — | — | — |
| 9 | .375 | 1.5 | | .3 | .3 | Walocel 40000 | 540 | 8 | 9+ | Sm | 80% |

Note: Examples 8, 8A have 0.6% CMC, 70:30 X33277-58-3:7H4XF

Example 1 is a control, using Culminal® MHPC 20000PFR as the thickener. Cracking and cratering are marginally acceptable. With other Culminal MHPC products of varying chemistries, other work has shown improvements in these two properties.

Example 2 shows that guar+CMC 7H4XF with 2% attapulgite clay gave a grainy, thick joint compound that further deteriorated with aging. It should be noted that 0.6% total thickener was used, not 0.4%, because past experience, including that gained from work for the above-cited patent references, indicated that 0.4% would be insufficient. 0.6% is excessive. Example 2A gave joint compound properties when the total thickener was reduced to 0.5%. It was seen that the joint compound still retained a grainy texture. The viscosity dropped from 760 (Example 2) to 600 BU, but, with aging, it too increased, and the texture of 2A thickened, not as badly as in Example 2, but enough to preclude its usefulness. When the total thickener level was reduced to 0.4%, Example 2B, the joint compound was initially slightly weak, lacking sag resistance, and was difficult to transfer from trowel to wallboard. In a short time, the yield stress (gel character) increased unacceptably, due to interactions of the CMC with the attapulgite. This behavior was not unexpected, having been noted with other CMC products when the atttapulgite clay was used at levels typical of what is used by the industry. It is concluded that in order to make CMC a useful joint compound thickener, the level of attapulgite would have to be significantly lowered.

Example 3 showed the effects of lowering the clay to 0.25%, the other conditions being the same as in Example 2. A total of 0.6% thickener, CMC 7H4XF+guar, was used. The joint compound viscosity was 550 BU, texture was only slightly grainy, adhesion, crack and crater resistance were very good. With short term aging, the joint compound thickened to a minor extent, was usable and of good quality after 3 days, as compared to Examples 2 and 2A which were very thick and unusable, and 2B which thickened to a slightly lesser degree.

Examples 4, 5, and 6 were run to determine the range of usefulness of CMC products in joint compounds, especially when blended with a guar product. Guar has never gained acceptance with joint compound producers because it tends to give a pasty, difficult-to-spread product. These Examples show that it can be used to give quality joint compounds with very good properties, when blended with two significantly different CMC products: Aqualon CMC X33432-76-2 (CMDS=0.92, DP=20,000) and X33277-58-3 (CMDS=1.12, DP=15,600). Example 4, thickened with a 50:50 blend of guar and Aqualon CMC X33432-76-2, is a very good joint compound, giving excellent properties, including adhesion. Example 5, with Aqualon CMC X33277-58-3, is very similar to Example 4; its only negative point is a slightly thick feel. To eliminate this minor drawback, the total thickener level was reduced to 0.5% (Example 6). This joint compound has all the positive traits of the above, without any thick or gummy feel. It, too, contains only 0.25% clay. The much-improved cracking and cratering with respect to the control and to the Examples with 2% clay are also notable. It is noted that if the guar were the sole thickener, the joint compound would be unstable, syneresis (bleeding) occurring in times dependent on other ingredients that are present and on how the joint compound was manufactured (e.g., time of mixing, pre-blending or individual addition of key ingredients). This unwanted drawback did not occur when CMC was present.

Examples 7 and 7A show that a blend of guar plus CMC may be used in the absence of clay. Noviant's Cekol® 100,000 product (CMDS=0.76, DP=9800) at a 0.6% total thickener level was used in these two Examples. The rheology was slightly different from that obtained in Examples 4–6 having 0.25% clay. The products of Examples 7 and 7A have less body and are looser. However, these properties are often preferred in regions where the climate tends to be cold, where such a "looser" joint compound will typically gain body as the temperature falls below summer averages. Example 7A shows that the elimination of the mica did not significantly affect joint compound properties, the only obvious change being a very slight increase in the already low level of cracking. Refer to Example 1 to note that the control, with 5% mica and no CMC, has a greater cracking occurrence.

Examples 8 and 8A show that CMCs may be used as the sole thickeners in joint compound. In the absence of clay, joint compound surfaces tend to dry out without proper safeguards; and, a weak body is usually evident. The CMCs used here were Aqualon X33277-58-3, described above, and 7H4XF, in a 70:30 ratio. The X33277-58-3 product from Aqualon closely matches the performance of the Cekol 100,000 product from Noviant, which was used in Examples 7 and 7A. Example 8, is over 10 weeks old, is retaining the rheological characteristics it had when first made, is not thickening or turning rubbery, and its surface is not showing signs of drying. Example 8A shows how the typical 2% clay level will cause the above joint compound to turn rubbery in short order. In less than 3 days, Example 8A had an elastic, rubbery consistency, did not flow, and was not spreadable. These properties could not be eliminated with mixing or shearing the joint compound. It has been determined that 1.0% is excessive, 0.75% may be acceptable, depending on other joint compound variables, and 0.5% is usually acceptable. In no instance did clay levels <0.5% give unacceptable properties to the joint compound.

EXAMPLE 9

This Example illustrates that it is preferred but not necessary to use guar as a part of the thickener package. If a co-thickener is deemed to be needed for specific improvements in a given formulation, MHPC with CMCs give excellent properties to the joint compound. Other prior work has shown that Nexton® HMHEC polymers also perform well in combination with CMC. It is expected that the same results would be had with the other types of CMC used in the present disclosure in combination with other typical joint compound thickener/rheology modifiers, including but not limited to hydroxyethylcellulose, Nexton HMHECs, methylhydroxyethylcellulose, and derivatized guar ethers.

EXAMPLES 10 TO 15

Lightweight Joint Compounds

Examples 10–15 show the benefits and limitations of the use of CMC in lightweight, perlite-containing formulations. The properties of the joint compounds are illustrated below. Table 3 below shows the specific components of the Examples and results of the testing of viscosity (BU), cracking, cratering, texture, and adhesion.

TABLE 3

LIGHTWEIGHT JOINT COMPOUND SPECIFIC DETAILS

| Ex. # | % clay | % mica | % Guar | % MHPC | % CMC | CMC Type | BU | Cracking | Cratering | Texture | Adhesion |
|---|---|---|---|---|---|---|---|---|---|---|---|
| 10 | 2.0 | 0 | 0 | 0.5 | 0 | — | 450 | 9 | 8 | sm | 80% |
| 11 | 0 | 0 | 0 | 0 | 0.6 | 7H4XF | 600 | 8 | 8 | sm | 85% |
| 11A | 0 | 0 | 0 | 0 | 0.5 | 7H4XF | 550 | 8 | 8 | sm | 80% |
| 12 | 0 | 0 | 0 | 0 | 0.6 | X33432-76-2 | 530 | 9 | 9 | sm | 90% |
| 12A | 0 | 0 | 0 | 0 | 0.5 | X33432-76-2 | 490 | 9 | 9 | sm | 90% |
| 13 | 0 | 0 | 0.3 | 0 | 0.3 | X33432-76-2 | 510 | 8 | 8 | sm | 85% |
| 14 | 0.75 | 0 | 0.3 | 0 | 0.3 | X33432-76-2 | 480 | 9 | 9 | sm | 85% |
| 15 | 0.75 | 0 | 0 | 0.3 | 0.3 | X33432-76-2 | 520 | 10 | 8 | sm | 100% |

The following definitions describe the ingredients used in Tables 2 and 3. CMC Types:
(1) X33432-76-2, Aqualon, CMDS=0.92, DP=20,000
(2) CMC 7H4XF, Aqualon, CMDS=0.78, DP=7500
(3) Cekol 100,000, Noviant, CMDS=0.76, DP=9800
(4) X33277-58-3, Aqualon, CMDS=1.12, DP=15,600
(5) Walocel 40000, Wolff, CMDS=0.78, DP=9800.

Co-Thickeners:
Galactosol 20H5F1 guar
Culminal: MHPC 2000OPFR (regular weight joint compound)
Methocel: J75MS (lightweight joint compound)
Numerical Ratings: Cracking and Cratering:
10: None
9: Trace
8: Very slight
7: Slight
6: Moderate
5: Moderate-Heavy
4: Heavy
Texture: sm=smooth,
gr=grainy.
(sl.=slightly)
Adhesion: % basis, measure of paper tape's bonding to the gypsum wallboard Example 10 is the control Example that shows the properties of the joint compound when Dow's Methocel® J75MS is the thickener/rheology modifier. The joint compound is acceptable in most respects. Adhesion was found to be 80%, which is generally considered by many to be the absolute minimum for commercially acceptable joint compounds.

Examples 11 and 11A show the properties imparted to the joint compound when CMC 7H4XF is the thickener, in the absence of clay. The joint compound had a thick texture when made; in 24 hours, it thickened to the point of being unspreadable. If diluted or prepared with more water, the thickening still occurred, although to a lesser extent. The joint compound would be usable if and only if it were used within 5–6 hours after preparation. (Properties of the joint compound were measured within this time frame). Example 11A shows that reducing the CMC concentration to 0.5% resulted in a slight decrease in adhesion, equal to that obtained with the control. It is not shown in Table 3 but it is emphasized that the 0.5% CMC level improved the stability with aging. The joint compound thickened to a slight degree, but was usable and easily spreadable after 3 days aging. It still lacked sag resistance (body) despite the increased viscosity (580 BU). Similar results were obtained with other CMC examples that had CMDS less than 0.9. It is concluded that CMC with a minimum CMDS≧0.76 can often give satisfactory properties to a lightweight joint compound and will be reasonably stable with aging. And, Examples 12 et seq show that a CMDS of 0.92 will give required properties to the lightweight joint compound, initially and (not shown in Table 3, but stated here) with aging. It is has also been found that the CMC with a CMDS of 1.12 behaves similarly to the instant Example. The CMDS 1.12 CMC does have lower viscosity, molecular weight, and DP; hence, adjustments in either CMC content or water level would be necessary to match exactly the properties obtained with the CMDS 0.92 CMC. CMDS of 1.12 also gives time-stable joint compound.

Examples 12 and 12A show the positive effects of increasing the CMDS to 0.92, in the absence of clay. Unlike what was seen in Examples 11 and 11A, these joint compounds were of excellent quality, initially and after aging. Adhesion was excellent, cratering improved over the control.

Example 13 illustrates the usefulness of guar as a co-thickener with the same CMC. The joint compound again is very acceptable, having a slightly thicker feel than what was obtained with Example 12 above, having the same thickener concentration, but 100% CMC. The sag resistance is slightly better with Example 13; it is possible that if the joint compounds were diluted for automated tool use, differences in application properties might be seen. Which would be preferred is of course a matter of personal taste by the user (and manufacturer), and is mentioned here only to reveal that there are differences due to the guar.

Examples 14 and 15 illustrate the properties obtained in the presence of clay, at the 0.75% level, when combinations of either CMC+guar or CMC+MHPC are used to thicken the joint compounds. Both are of excellent quality. Their rheological properties are different due to the presence of clay. Which of these would be preferred is again a matter of personal preference. If the clay were increased to 1% level, some instability and graininess begin to be noted. It is concluded that when CMC is all or part of the thickener package, the clay level should not exceed about 0.75% in order to maximize joint compound properties. It was also shown that acceptable properties were obtained in the absence of clay. Rheologies differ, the preferred being a matter of personal choice. It has also been seen that the use level of CMC-containing thickeners may be lowered to levels as low as 0.4%.

While the invention has been described with respect to specific embodiments, it should be understood that they are not intended to be limiting and that many variations and modifications, particularly of the blends of polymers, are possible without departing from the scope, intent, and spirit of this invention.

What is claimed is:

1. A ready-mix, drying type tape joint compound composition comprising a binder, a thickener system, a filler, water, and a biocide, wherein the thickener system comprises an uncrosslinked sodium carboxymethylcellulose (CMC) with a degree of substitution (DS) lower limit of 0.76 and a degree of polymerization (DP) lower limit of 1,000 and is present in an amount of 0.01 to 0.6% by weight based on the total weight of the composition.

2. The ready-mix, drying type tape joint compound composition of claim 1, wherein the thickener system is the uncrosslinked CMC that has a DS lower limit of 0.78.

3. The ready-mix, drying type tape joint compound composition of claim 1, wherein the thickener system is the uncrosslinked CMC that has a DS lower limit of 0.90.

4. The ready-mix, drying type tape joint compound composition of claim 1, wherein the thickener system is the uncrosslinked CMC that has a DS upper limit of 1.5.

5. The ready-mix, drying type tape joint compound composition of claim 1, wherein the thickener system is the uncrosslinked CMC that has a DS upper limit of 1.2.

6. The ready-mix, drying type tape joint compound composition of claim 1, wherein the thickener system is the uncrosslinked CMC that has a DP lower limit of 5,000.

7. The ready-mix, drying type tape joint compound composition of claim 1, wherein the thickener system is the uncrosslinked CMC that has a DP lower limit of 6,000.

8. The ready-mix, drying type tape joint compound composition of claim 1, wherein the thickener system is the uncrosslinked CMC that has a DP upper limit of 25,000.

9. The ready-mix, drying type tape joint compound composition of claim 1, wherein the thickener system is the uncrosslinked CMC that has a DP upper limit of 20,000.

10. The ready-mix, drying type tape joint compound composition of claim 1, wherein the thickener system is the uncrosslinked CMC blended with other commercially available CMC products that gives the properties of standard clay-containing joint compounds but in the absence of any clay.

11. The ready-mix, drying type tape joint compound composition of claim 10 wherein the CMC blend includes a CMC with CMDS less than 0.75.

12. The ready-mix, drying type tape joint compound composition of claim 1, wherein the thickener system includes a co-thickener selected from the group consisting of ethylhdyroxyethyl cellulose (EHEC), hydroxyethyl cellulose (HEC), hydrophobically modified hydroxyethylcellulose, hydroxypropyl methylcellulose (HPMC), methylhydroxyethyl cellulose (MHEC), hydroxypropyl guar, and underivatized guar.

13. The ready-mix, drying type tape joint compound composition of claim 1, wherein the lower limit of the amount of the thickener system is 0.3 weight %.

14. The ready-mix, drying type tape joint compound composition of claim 1, wherein the binder is selected from the group consisting of polyvinyl alcohol, ethylene vinyl acetate latex, poly(vinyl acetate) latex, starch, casein, polyacrylamide, and copolymers of acrylamide and acrylic acid.

15. The ready-mix, drying type tape joint compound composition of claim 14, wherein the binder is present in the amount of lower limit of about 1.0 weight % and an upper limit of about 3.0 weight %.

16. The ready-mix, drying type tape joint compound composition of claim 15, wherein the binder is present in the amount of about 2.5 weight %.

17. The ready-mix, drying type tape joint compound composition of claim 1, wherein the filler is selected from the group consisting of calcium carbonate, calcium sulfate dihydrate, and dolomitic limestone, and mixtures thereof.

18. The ready-mix, drying type tape joint compound composition of claim 17, wherein the filler is calcium carbonate.

19. The ready-mix, drying type tape joint compound composition of claim 1, wherein the amount of the filler lower limit is about 45 weight %.

20. The ready-mix, drying type tape joint compound composition of claim 1, wherein the amount of the filler lower limit is about 50 weight %.

21. The ready-mix, drying type tape joint compound composition of claim 1, wherein the amount of the filler upper limit is about 65 weight %.

22. The ready-mix, drying type tape joint compound composition of claim 1, wherein in order to maintain the desired pH of 8 to 10, a pH modifier is present.

23. The ready-mix, drying type tape joint compound composition of claim 1, wherein the biocide is selected from the group consisting of 2[(hydroxymethyl)amino]ethanol and 1,2-benzisothiazolin-3-one.

24. The ready-mix, drying type tape joint compound composition of claim 23, wherein the biocide is present in an amount lower limit of about 0.05 to about 1.0 weight %.

25. The ready-mix, drying type tape joint compound composition of claim 1, wherein clay or mica or mixtures thereof are present.

26. The ready-mix, drying type tape joint compound composition of claim 25, wherein the clay is present and is selected from the group consisting of sepiolite, montmorillonite, bentonite, illite, kaolin, and attapulgite.

27. The ready-mix, drying type tape joint compound composition of claim 26, wherein the clay is attapulgite.

28. The ready-mix, drying type tape joint compound composition of claim 25, wherein the clay is present in the amount upper limit of 1.0 weight %.

29. The ready-mix, drying type tape joint compound composition of claim 25, wherein the clay is present in the amount upper limit of 0.75 weight %.

30. The ready-mix, drying type tape joint compound composition of claim 25, wherein the clay is present in the amount upper limit of 0.50 weight %.

31. The ready-mix, drying type tape joint compound composition of claim 25, wherein mica is present in the amount upper limit of 1.5 weight %.

32. The ready-mix, drying type tape joint compound composition of claim 1, wherein perlite is present.

33. The ready-mix, drying type tape joint compound composition of claim 1, wherein perlite is present in the mount upper limit of 8.5 weight %.

34. The ready-mix, drying type tape joint compound composition of claim 1, wherein perlite is present in the mount upper limit of 6.0 weight %.

35. The ready-mix, drying type tape joint compound composition of claim 1, wherein at least one other ingredient is present selected from the group consisting of air entraining agents, surfactants, humectants, defoamers, and mixtures thereof.

36. The ready-mix, drying type tape joint compound composition of claim 1, wherein the density of the composition is 7 to 11 pounds per gallon (ppg).

37. The ready-mix, drying type tape joint compound composition of claim 1, wherein the density of the composition is 12 to 15 ppg.

38. The ready-mix, drying type tape joint compound composition of claim 1, wherein the water is present in a sufficient amount to provide viscosity of the joint compound composition in the range of from about 300 to about 700 Brabender units (BU).

* * * * *